United States Patent [19]

Hara et al.

[11] Patent Number: 4,963,435

[45] Date of Patent: Oct. 16, 1990

[54] WIRE WITH COATING FOR ULTRASONIC BONDING

[75] Inventors: Shigeo Hara, Minamiashigara; Setsuo Sekine, Yokohama; Toshio Suzuki, Chigasaki; Minoru Taguchi, Odawara; Akio Mitsuoka; Yoshiyuki Tetsu, both of Hitachi, all of Japan

[73] Assignees: Hitachi, Ltd., Tokyo; Hitachi Computer Peripherals Co., Ltd., Odaware; Hitachi Cable, Ltd., Tokyo, all of Japan

[21] Appl. No.: 279,045

[22] Filed: Dec. 2, 1988

[30] Foreign Application Priority Data

Dec. 2, 1987 [JP] Japan .................. 62-303364

[51] Int. Cl.⁵ .................. B32B 15/00; B32B 15/08; D02G 3/00
[52] U.S. Cl. .................. 428/379; 428/375; 525/454; 525/528
[58] Field of Search .................. 428/379, 375, 383; 525/454, 528

[56] References Cited

U.S. PATENT DOCUMENTS

| 4,511,624 | 4/1985 | Kawaguchi | 428/375 |
| 4,734,545 | 3/1988 | Susuki | 428/383 |
| 4,762,751 | 8/1988 | Girgis | 428/378 |
| 4,786,693 | 11/1989 | Hefner | 525/454 |
| 4,816,545 | 3/1989 | Re et al. | 525/389 |
| 4,833,227 | 5/1989 | Re et al. | 528/73 |

Primary Examiner—George F. Lesmes
Assistant Examiner—J. M. Gray
Attorney, Agent, or Firm—Kenyon & Kenyon

[57] ABSTRACT

A wire with a coated layer for bonding to a joint body by ultrasonic vibration, the coated layer of said wire comprising urethane resin having formulated therein a brominated epoxy resin.

2 Claims, 2 Drawing Sheets

WIRE WITH COATING FOR ULTRASONIC BONDING

BACKGROUND OF THE INVENTION

1. Field of the Invention

The present invention relates to a wire for a magnetic head with coating which is bonded to a joint body utilizing a ultrasonic bonding apparatus and more particularly, to a wire of micron order coated with urethane resin which is suited to utilize as a signal transfer wire for a thin layer magnetic head mounted on a magnetic disc apparatus.

2. Description of the Prior Art

A wire coated with urethane resin has been heretofore used as a signal transfer wire for a thin layer magnetic head. The coated wire is bonded to the terminal, which is a joint body of the thin layer magnetic head, by soldering.

In the case of soldering, however, heat greatly generates over a wide range of the thin layer magnetic head with an adverse affect. As a result, there is a problem that defective thin layer magnetic heads might be provided.

For this reason, for example, thermocompression bonding system, ultrasonic system, thermocompression bonding system associated with ultrasonic system and the like are proposed, instead of soldering coated wires.

The thermocompression bonding system comprises removing the coated layer on a wire by heating and melting the wire with a bonder of thermocompression bonding apparatus and bonding the wire exposed with the bonder to a joint body.

The ultrasonic system generally comprises previously removing a coated layer on a wire and giving ultrasonic vibration to the wire by a welding chip of ultrasonic bonding apparatus thereby to bond the wire to a joint body. As is shown in Japanese Patent Application KOKAI (Laid Open) (the term "KOKAI" as used herein refers to a published unexamined application) Nos. 42287/1977 and 104787/1977, the ultrasonic system may also be modified by two stage changeover of ultrasonic vibration so that removal of the coated layer and wire bonding can be performed by ultrasonic vibration alone.

The thermocompression bonding system associated with ultrasonic system comprises, as is shown in Japanese Patent Application Kokai No. 59 680/1982, heating the coated layer on a wire with a welding chip to melt as in the thermocompression bonding system and bonding the exposed wire to a joint body through the welding chip by ultrasonic vibration.

These three systems described above may be considered to be preferable because heat acts on a thin layer magnetic head only at an extremely limited area. However, particularly in the thermocompression bonding system and the thermocompression bonding system associated with ultrasonic system, the coated layer on a wire is heated and melts at high temperatures so that there is a fear that defective thin layer magnetic heads might be produced. Accordingly, the ultrasonic system that is free from heating at high temperatures is most suited for bonding a wire as a signal transfer wire for thin layer magnetic head.

In the ultrasonic system as shown in Japanese Patent Application KOKAI Nos. 42287/1977 and 104787/1977, removal of the coated layer on a wire and bonding of the wire can be performed only by ultrasonic vibration; however, a large ultrasonic energy is required for removal of the coated layer in commercially available coated wire in which the coated layer comprises urethane resin and, a primary coat of the terminal as a joint body is thus destroyed by the large ultrasonic energy, reliance is poor and it takes a long time for removal of the coated layer. As a result, too long period of time is required until bonding is completed, which is a problem in operability in a large scale production system.

SUMMARY OF THE INVENTION

An object of the present invention is to provide a wire with coating for ultrasonic bonding which can be surely bonded in a simple manner, can improve operability and provides high reliance, without destroying a primary coat of joint body.

That is, the present invention provides a wire with coating for ultrasonic bonding which is bonded by ultrasonic vibration, the coating comprising urethane resin having formulated therein a brominated epoxy resin.

DETAILED DESCRIPTION OF THE INVENTION

Figure 1:
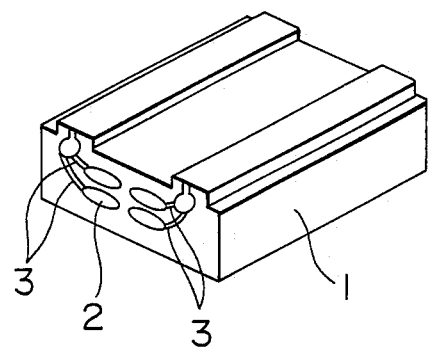
FIG. 1 is a perspective view of a magnetic disc apparatus in which the wire with coating for ultrasonic bonding of the present invention is applied to a thin layer magnetic head.

As a result of various experiments and extensive investigations, the present inventor has considered that the problems described above would be caused by the wire with coating comprising urethane resin and has found materials for the coated layer that can be bonded by the minimum ultrasonic energy without destroying a primary coat of the terminal as a joint body, upon utilizing heat generated by ultrasonic vibration.

That is, according to the present invention, the coated layer of wire with coating comprises urethane resin having formulated therein brominated epoxy resin.

In ultrasonic vibration of the coated wire to a joint body, heat is generated between a welding chip and the coated wire and between the wire and the joint body, due to friction of the ultrasonic vibration. By the heat, bromine in the brominated epoxy resin of the coated layer reacts with hydroxy group —OH in the urethane resin to accelerate decomposition of urethane resin, whereby the contact area between the welding chip of the coated layer and the joint body is removed. In this case, when the coated layer is lightly destroyed due to decomposition of urethane resin, mechanical destruction spreads from the portion destroyed by the ultrasonic vibration. Then, ultrasonic vibration is further given by the welding chip so that the exposed core of the coated wire is bonded to the joint body.

According to the present invention, as has been described above, bromine in the brominated epoxy resin of the coated layer causes a chemical reaction due to the heat generated by the ultrasonic vibration and accelerates the decomposition of urethane resin, thus resulting in removal of the coated layer. Therefore, even though the system is an ultrasonic one, the decomposition of urethane resin is accelerated by chemical reaction of bromine and hence, ultrasonic energy required for removing the coated layer can be minimized. As a result, the primary coat of the joint body can be prevented from being destroyed. In addition, removal of the coated layer can be completed in a short period of time and a time period required for bonding the coated wire can be shortened. Thus, operability can be improved even by bonding in the ultrasonic system and it is also effective for increasing reliability.

(Working Example)

Hereafter the embodiments of the present invention are described in more detail by referring to the drawings appended.

Wire with coating for ultrasonic bonding (hereafter simply referred to as wire) 3, which is an embodiment of the invention, is bonded to terminal 2, which is a joint body of thin layer magnetic head 1, through ultrasonic bonding by a ultrasonic bonding apparatus and is used as a signal transfer wire.

The aforesaid wire 3 is obtained by gold plated core wire 4 comprising copper wire, etc., has a diameter as small as, for example, about 50 μm and covered with a thin coated layer 5 having a thickness of a few μm.

Figure 3:
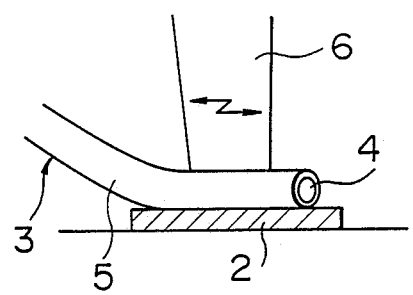
FIG. 3 is an explanatory drawing to show ultrasonic joint with a ultrasonic bonding apparatus.
Figure 4:
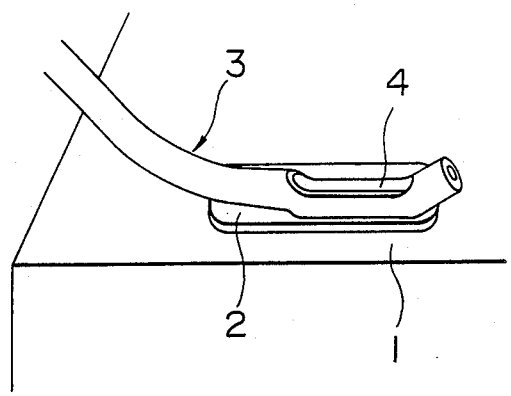
FIG. 4 is a perspective view showing a bonded state between a coated wire for ultrasonic bonding and a joint body.

The coated layer 5 described above comprises urethane resin in which brominated epoxy is resin formulated. As is shown in FIG. 3, when wire 3 is ultrasonically vibrated to terminal 2 by welding chip 6 of the ultrasonic bonding apparatus, heat is generated between welding chip 6 and coated layer 5 of wire 3 and between the coated layer 5 and terminal 2, due to the ultrasonic vibration. By the heat, bromine in the brominated epoxy resin reacts with hydroxy group —OH in the urethane resin to form hydrogen bromide and accelerate decomposition of urethane resin, whereby the contact area between the welding chip 6n and the terminal 2 is removed. In this case, when a ratio of the brominated epoxy resin formulated to the urethane resin is small, decomposition of urethane resin is accelerated only with difficulty which makes impossible to remove coated layer 5. When a ratio of the brominated epoxy resin is large, decomposition of urethane resin is vigorous and there is a fear that even unnecessary area of the coated layer might be removed. Thus, a ratio of the brominated epoxy resin to be formulated must be appropriately chosen depending upon thickness of the coated layer 5, degree of ultrasonic vibration, etc. but the ratio is preferably in a range of approximately 5 to 50 wt %.

The brominated epoxy resin to be formulated into the urethane resin is exemplified by the following chemical structure.

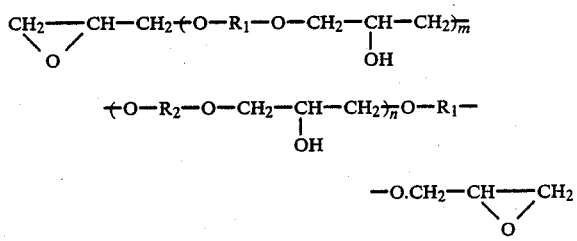

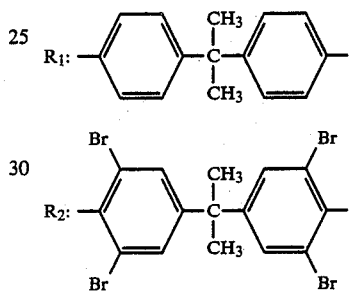

The brominated epoxy resin undergoes thermal decomposition as follows, due to the heat generated by ultrasonic vibration energy.

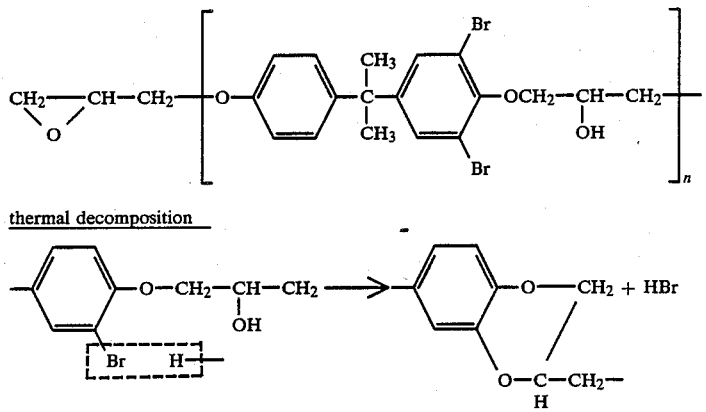

Polyurethane undergoes thermal decomposition as follows.

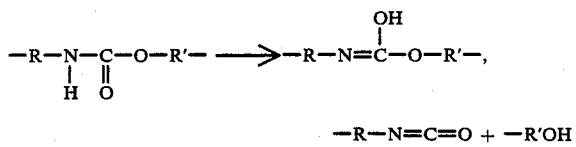

When decomposition further proceeds, it is assumed that polyurethane would be degraded into $H_2O$, $CO_2$, $NO_2$ or low molecular hydrocarbons, via various decomposition modes.

By HBr generated by thermal decomposition of the brominated epoxy resin, polyurethane resin further decomposed as follows.

When decomposition further proceeds, it is assumed that polyurethane would be degraded into $H_2O$, $CO_2$, $NO_2$ or low molecular hydrocarbons, via various decomposition modes.

By HBr generated by thermal decomposition of the brominated epoxy resin, polyurethane resin further decomposed as follows.

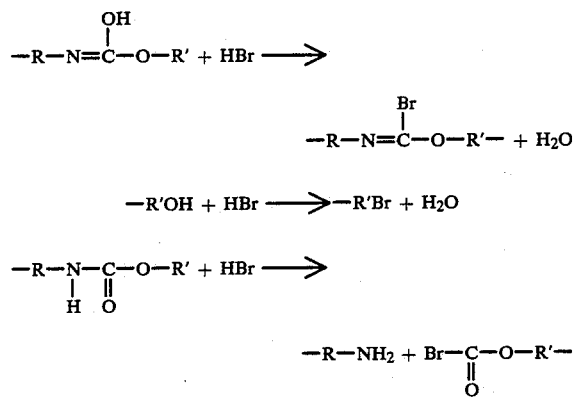

Further in order to cause lost slipping with difficulty between wire 3 and coated layer 5 upon ultrasonic vibration, it is desired to provide a coarse surface at the tip of welding chip 6 thereby to increase its frictional force.

Figure 2:
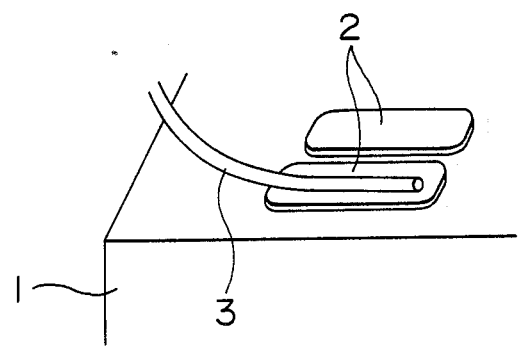
FIG. 2 is a perspective view showing a positioning state of the coated wire for ultrasonic bonding and a joint body.

Next, to bond the thus constructed wire 3 to terminal 2 by ultrasonic bonding apparatus, the tip of wire 3 is firstly positioned on the upper surface of terminal 2 of thin layer magnetic head 1 set on a bonding rest (not shown) of the ultrasonic bonding apparatus, as shown in FIG. 2. As shown in FIG. 3, wire 3 is ultrasonically vibrated to terminal 2 by welding chip 6 while pressing. Then, heat generates by vibration friction between welding chip 6 and wire 3 and between wire 3 and terminal 2. By the heat, bromine in the brominated epoxy resin reacts with hydroxy group —OH in the coated layer 5 of wire 3 to form hydrogen bromide, which accelerates decomposition of urethane resin. Thus, the contact area between the welding chip 6 of coated layer 5 and the terminal 2 is removed. Further by giving ultrasonic vibration through ultrasonic chip 6 while compressing, the exposed core wire 4 is bonded to the terminal 2.

Figure 5:
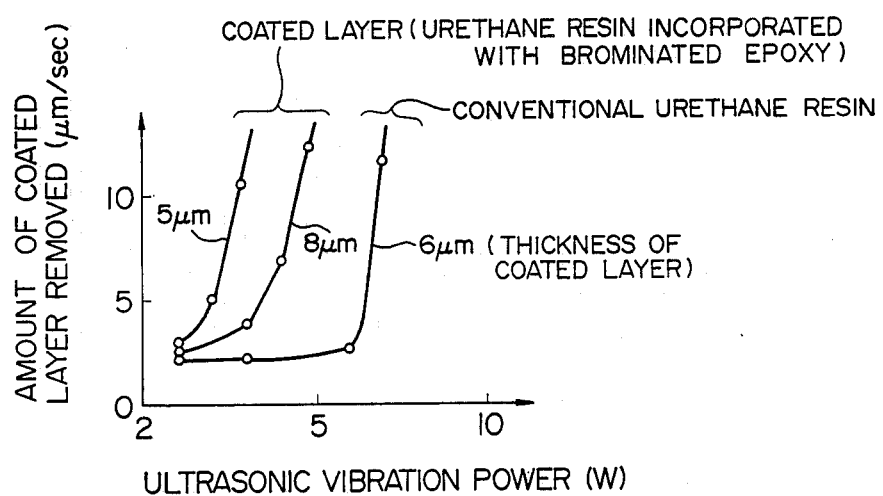
FIG. 5 is an explanatory drawing to show relationship between a ultrasonic vibration power and an amount of coated layer removed, upon ultrasonic bonding to the wire with coating for ultrasonic bonding of the present invention and to a conventional coated layer composed of urethane resin alone.

Accordingly, bromine in the brominated epoxy resin of coated layer 5 causes chemical reaction due to the heat generated by the ultrasonic vibration to accelerate decomposition of the urethane resin and thus the coated layer 5 can be removed. Therefore, ultrasonic energy (ultrasonic vibration power) required for removing the coated layer can be reduced and a primary coat of the terminal 2 can be prevented from being destroyed correspondingly to the reduction. In addition, a time period required for removal of the coated layer 5 can be shortened as shown in FIG. 5, as compared to conventional coated layer comprising urethane resin alone. As a result, a time period required for bonding of wire 3 can be shortened.

FIG. 5 is an explanatory drawing to show relationship between a ultrasonic vibration power and an amount of coated layer removed, when the wire 3 of the embodiment and a conventional coated layer comprising urethane resin alone were subjected to ultrasonic bonding, respectively. In the figure, the wires coated with coated layer 5 having a thickness of 5 μm and coated with coated layer 5 having a thickness of 8 μm, respectively, which are embodiments of the invention, comprise urethane resin incorporated with brominated epoxy resins (manufactured by Mitsubishi Petrochemical and Shell Co., Ltd., E-5050 and 5051; bromine content of 47 to 53%) in ratios of 6 to 8 wt % based on urethane resin. When compared with the wire in which coated layer 5 having a thickness of 6 μm is composed of urethane resin alone, it is understood that the coated layer 5 can be surely removed in a short period of time even though ultrasonic vibration power is small and the coated layer 5 has a thickness of 8 μm. Accordingly, it can be assumed from FIG. 5 that the ultrasonic energy can be reduced as much, removal of the coated layer 5 can be completed in a short period time and a bonding time can be shortened.

Further, heat generates also by ultrasonic vibration but the heat is limited to an extremely small area as compared to the heat generated upon conventional soldering. Also even as compared to the heat generated in the thermocompression bonding system, etc., the temperature is low and occurrence of defective thin layer magnetic heads can be prevented.

In the embodiments shown in the drawings, the brominated epoxy resin was used as accelerating the decomposition of urethane resin in coated layer 5 but it is also possible to obtain similar effects even with other halogenated epoxy resin, for example, chlorinated or fluorinated resin. Further in the embodiments shown in the drawings, the wire 3 was utilized as a signal transfer wire for thin layer magnetic head but is, of course, applicable also to sord bonded to chip electrodes of highly integrated semi-conductors.

As has been described above, according to the present invention, the coated layer of coated wire comprises urethane resin having formulated therein brominated epoxy resin and upon ultrasonic vibration of the coated wire, bromine in the brominated epoxy resin of the coated layer forms hydrogen bromide due to the heat generated by the ultrasonic vibration to accelerate decomposition of urethane resin, whereby the coated layer is removed. Therefore, ultrasonic energy required for removal of the coated layer can be minimized and there is no fear that a primary coat of the joint body might be destroyed correspondingly. Besides, a bonding time of wire 3 can be shortened so that operability can be improved even by bonding in the ultrasonic system and reliability can be enhanced.

What is claimed is:

1. A wire for a magnetic head with a coated layer for bonding to a joint body by ultrasonic vibration, said coated layer of the wire comprising urethane resin having mixed in a ratio of 5 to 50 wt. % a brominated epoxy resin having the following chemical structure:

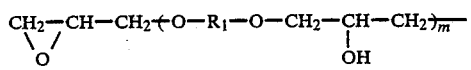

-continued
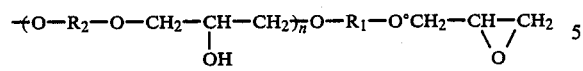
wherein $R_1 =$ 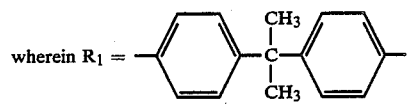
-continued
$R_2 =$ 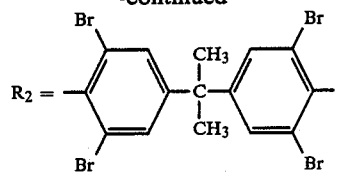
and m and n are greater than or equal to 1.
2. A wire for a magnetic head with a coated layer according to claim 1, wherein said coated layer comprises about 5 to about 8 wt. % of the brominated epoxy resin.
* * * * *

UNITED STATES PATENT AND TRADEMARK OFFICE
CERTIFICATE OF CORRECTION

PATENT NO. : 4,963,435  Page 1 of 2
DATED : 16 October 1990
INVENTOR(S) : HARA et al.

It is certified that error appears in the above-identified patent and that said Letters Patent is hereby corrected as shown below:

| Column | Line | |
|---|---|---|
| TITLE PAGE [54] | | Change title to: --WIRE FOR A MAGNETIC HEAD WITH COATING FOR ULTRASONIC BONDING--. |
| 1 | 1-2 | Change title to --WIRE FOR A MAGNETIC HEAD WITH COATING FOR ULTRASONIC BONDING--. |
| 1 | 9 | Before "ultrasonic" change "a" to --an--. |
| 2 | 18 | After "wire" insert --for a magnetic head- |
| 2 | 31 | Before "ultrasonic" change "a" to --an--. |
| 2 | 35 | Before "ultrasonic" change "a" to --an--. |
| 4 | 20 | Change "--O.$CH_2$" to -- --O·$CH_2$ --. |
| 5 | 6 | Before "further" insert --is--. |
| 5 | 8-14 | Delete entirely. |
| 6 | 4 | Before "ultrasonic" change "a" to --an--. |

UNITED STATES PATENT AND TRADEMARK OFFICE
CERTIFICATE OF CORRECTION

PATENT NO. : 4,963,435

DATED : October 16, 1990

INVENTOR(S) : Shigeo Hara, et al.

It is certified that error appears in the above-identified patent and that said Letters Patent is hereby corrected as shown below:

Column 6, line 24 After "period" insert --of--.

Signed and Sealed this

Twenty-seventh Day of October, 1992

Attest:

DOUGLAS B. COMER

*Attesting Officer*          *Acting Commissioner of Patents and Trademarks*